Nov. 14, 1967  J. B. DEE ETAL  3,352,757
FUEL ELEMENT
Filed Sept. 30, 1965

INVENTORS
JOHN B. DEE,
MASSOUD T. SIMNAD.
BY
Anderson, Luedeka, Fitch, Even, & Tabin
ATTYS.

United States Patent Office

3,352,757
Patented Nov. 14, 1967

3,352,757
FUEL ELEMENT
John B. Dee, Rancho Santa Fe, and Massoud T. Simnad, San Diego, Calif., assignors to General Dynamics Corporation, New York, N.Y., a corporation of Delaware
Filed Sept. 30, 1965, Ser. No. 491,539
8 Claims. (Cl. 176—68)

This invention relates to the construction of fuel elements for nuclear reactors and, more particularly, to an improved fuel element for use in a water cooled pulsing nuclear reactor.

One form of fuel element for a nuclear reactor comprises a solid fuel body of fissle material or mixture of fissile and fertile material, with or without other substances, such as moderating materials. The fuel body is enclosed in a metallic container adapted to provide good thermal conductivity and to retard the escape of fission products therefrom. A plurality of such fuel elements are utilized in the so-called TRIGA reactor, a form of which is described in U.S. Patent No. 3,156,624 issued on Mar. 31, 1964, and assigned to the assignee of the present invention. The core of the reactor shown and described therein is submerged in water which serves as a reflector moderator, coolant and radiation shield. Water surrounds each of the fuel elements in the core.

The reactor described in the aforementioned application has a high prompt negative temperature coefficient of reactivity and therefore may be subjected to a sudden large pulse of power surge as by withdrawing all or a portion of the control rods from the reactor core. In such a reactor, high temperatures attained in the fuel bodies of the fuel elements during pulsing may cause the outer surfaces of the containers to reach a temperature sufficient to cause film boiling. This phenomenon generally occurs adjacent localized areas on the surface of a container and results when the cooling water adjacent that area exceeds the boiling point. Since vapor is thereby disposed between the container and the cooling water in the region of film boiling, heat from the fuel body will not be carried away at a sufficient rate and the container may become heated locally to a very high temperature. Under these conditions, distortion of the container may occur depending on factors such as the fuel body temperature, the container temperature reached, the local temperature gradients in the container, and the residual stress in the container resulting from forming during manufacture. In addition to the film boiling problem, differences in thermal expansion between the fuel body and the container, during high heating of the fuel body, such as occurs rapidly during pulsing, may place forces on the container which exceed its yield strength, resulting in permanent deformation of the container.

In order to permit fuel element operation at higher temperatures by suppression of film boiling through adequate cooling of the fuel element, forced convection of water in the core may be established. The water flow in the core past the fuel elements carries away sufficient heat to decrease the possibility of film boiling during or immediately after a pulse. The use of forced convection, however, increases the equipment required, adds additional complexity to the reactor and its operation, and tends to restrict the amount of space available and hinder experimental access to the reactor core.

Accordingly, it is an object of this invention to provide an improved fuel element for use in nuclear reactors.

Another object of the invention is to provide a fuel element wherein the likelihood of deformation of the container is minimized.

Still another object of the invention is to provide a fuel element wherein the incidence of film boiling at high operating temperatures is negligible.

Other objects and the various advantages of the invention will become apparent to those skilled in the art from the following description taken in connection with the accompanying drawings wherein.

In accordance with the invention, the fuel element comprises a solid elongated generally cylindrical fuel body. The fuel body is enclosed in a sealed elongated generally cylindrical metallic container. The outer diameter of the fuel body is sufficiently less than the inner diameter of the container that a substantial difference in the two diameters is maintained throughout the operating range of temperatures of the fuel element notwithstanding differences in the thermal expansion of the fuel body and the container. Means are provided intermediate the container and the fuel body to maintain an insulating gap therebetween. The gap may be filled with gas and provides thermal insulation between the fuel body and the container. Although particularly adapted for use in a TRIGA reactor such as shown and described in the aforesaid U.S. Patent No. 3,156,624, the invention is applicable to fuel elements in any pulse type of reactor wherein high temperature operation raises problems such as film boiling and container deformation.

Figure 1:
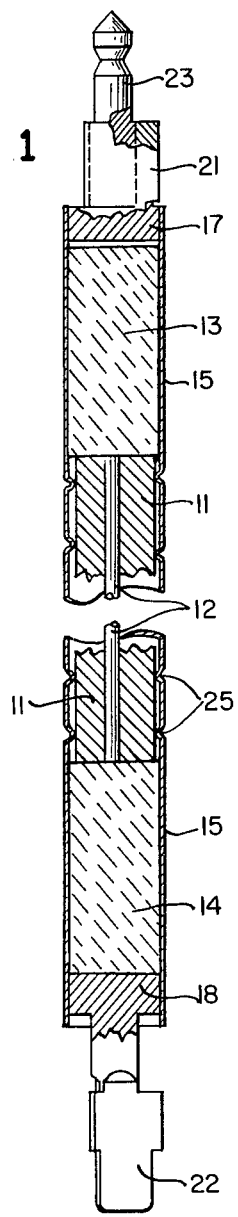
FIGURE 1 is a partially sectioned elevational view of a fuel element constructed in accordance with the invention and with the central part broken out to preserve space.
Figure 2:
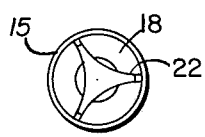
FIGURE 2 is an end view of the fuel element of FIGURE 1.

Referring more particularly to FIGURES 1 and 2, a fuel element constructed in accordance with the invention is shown. The fuel element comprises a solid elongated generally cylindrical fuel body 11. When used in a TRIGA reactor, this fuel body preferably contains approximately eight and one-half weight percent of uranium enriched to 20% in U–235. The hydrogen to zirconium atom ratio of the moderator material homogeneously combined with the enriched uranium is preferably about 1.65 to 1. The fuel body 11 may be approximately 15 inches in length and approximately one and one-half inches in diameter. To facilitate hydriding, a 0.2 inch diameter hole may be drilled through the center of the fuel body 11 and a zirconium rod 12 may be inserted in this hole after the hydriding operation is completed. Graphite cylinders 13 and 14 are provided at either end of fuel body 11 and are preferably about 3½ inches in length and 1½ inches in diameter. These graphite cylinders act as top and bottom reflectors.

The fuel body 11 and the top and bottom graphite cylinders 13 and 14 are contained in a metallic elongated generally cylindrical container 15. For a TRIGA reactor, the container is preferably constructed to stainless steel or nickel based alloy of approximately 0.020 inch thick. A top fitting 17 and a bottom fitting 18 are provided at each end of the container 15 and are welded in place to seal the container against entry of cooling water surrounding the container when it is in position in a reactor core. The end fittings 17 and 18 each have a vaned guide structure 21 and 22 thereon for supporting the fuel element in place in the reactor core. A handling fixture 23 is provided at the top end of the fuel element for insertion and removal of the fuel element in and out of the reactor core. Suitable thermocouples may be placed at various points in the fuel body and on the container therefor to monitor temperatures in the fuel element at such points.

The dimensions of the fuel element herein given are suitable for a fuel element used in a TRIGA reactor. The invention is not necessarily limited to use in connection with a fuel element of such dimensions, however.

As previously mentioned, the problem of film boiling on the exterior surface of a fuel element, although only localized, can result in overheating of the container and permanent deformation thereof. Such deformation can result from the thermal stresses produced in the container or from the fact that the internal pressures exerted on the container may produce forces exceeding the yield point of the container when the latter is heated to sufficiently high temperatures. It is well known that forced convection of the cooling water in the reactor core may be used to decrease the incidence of film boiling on a fuel element container at high fuel element temperatures such as are encountered during or immediately after a high reactivity pulse. As previously mentioned, however, the use of forced convection necessitates undesirable expense and produces inconvenience in certain applications of the nuclear reactor.

In accordance with the invention, the fuel element is constructed such that the heat transfer rate between the fuel body and the container therefor is sufficiently low that natural convection in the cooling water is sufficient to carry heat away and prevent film boiling on the surface of the fuel element container. To accomplish this, the outer diameter of the fuel body 11 is made substantially less than the inner diameter of the container 15. The difference in the diameters is sufficient to maintain an insulating gap between the two members of the fuel element throughout the operating range of temperatures of the fuel element. Thus, even though the fuel element is pulsed to a very high reactivity, and the temperatures produced are correspondingly high, differential expansion of the fuel body and the container will not be so extensive as to eliminate the gap between the two members. For a 1½ inch diameter fuel body the gap should preferably be a minimum of 10 mils at room temperature in order to provide sufficient room for differential expansion. This gap measurement should be increased, for example to 15 or more mils, when higher temperatures necessitate more room for the greater differential expansions involved. The maximum operating temperatures, including those reached by reactivity pulsing if the reactor operates in this manner, should not result in differential expansion any greater than would leave a four or five mil gap between the fuel body and the container therefor.

Figure 3:
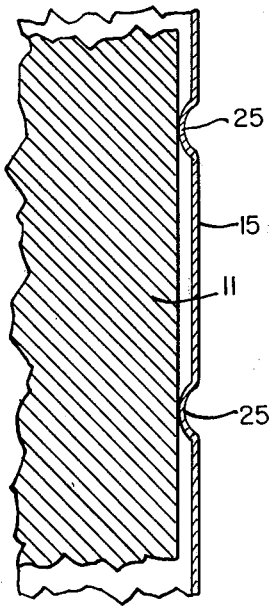
FIGURE 3 is an enlarged section view of a portion of the fuel element of FIGURES 1 and 2.
Figure 4:
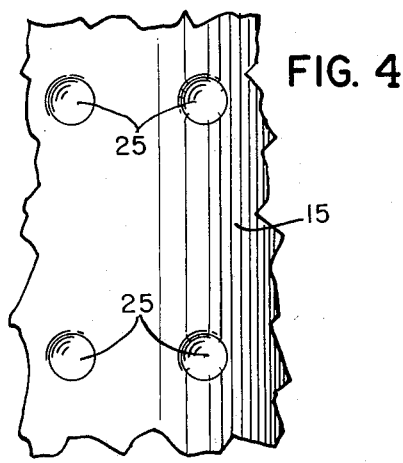
FIGURE 4 is an enlarged view of a portion of the exterior surface of the fuel element of FIGURES 1 and 2.

In order to maintain the gap between the fuel body 11 and the container 15 and to prevent relatively large areas of contact between the fuel body and the container, the container 15 is provided with a plurality of dimples 25 formed therein (see FIGURES 3 and 4). Referring particularly to FIGURE 3, which is an enlarged sectional view illustrating the function of the dimples, it will be seen that the dimples 25 consist of localized depressions in the skin of the container 15 about its periphery. Dimples 25 extend radially inward from the walls of container 15 and engage the outer surface of the fuel body 11. The dimples 25 help to maintain the gap between fuel body 11 and container 15 so that no relatively large areas of the fuel body 11 come in contact with the inner surface of container 15. It will be understood that because of the gap, the heat transfer rate between fuel body 11 and container 15 is relatively low. Accordingly, the likelihood of high heating of container 15 during pulsing and resultant film boiling on the surface of container 15 is minimized, and the temperature of container 15 remains at safe levels. The gap between fuel body 11 and container 15 may be filled with a gas having desired heat transfer characteristics, such as nitrogen gas. Local heating and stresses applied to the dimples have a negligible affect on the rest of the container.

Other devices which might be employed to maintain the spacing between fuel body 11 and container 15 in place of dimples 25 are: elongated ribs extending axially and formed in the container 15; a wound wire of tungsten, molybdenum or graphite surrounding the fuel body 11; or a porous ceramic filler or coating, such as aluminum oxide, sprayed on the interior of container 15. Maintaining a spacing between the container 15 and the fuel body 11 also reduces the danger of permanent elongation of the container 15 due to thermal-expansion of the fuel body such that the fuel body engages the walls of the container. To further insure against elongation of container 15, the graphite cylinder 13 is spaced from the end 17 of container 15 and is movable axially to allow for axial expansion of the fuel body 11 with respect to container 15.

It may therefore be seen that the invention provides an improved fuel element for use in a nuclear reactor. The fuel element has particular application to a nuclear reactor wherein the core is submerged in a pool of water and wherein water completely surrounds each element. The fuel element exhibits a minimum deformation in the container therefor because the incidence of film boiling at high operating temperatures is minimized and because there are no major areas of contact between the fuel body and the container despite differential thermal expansion. Various other embodiments and modifications of the invention will be apparent from the foregoing description to those skilled in the art, and such embodiments and modifications are intended to fall within the scope of the appendant claims.

We claim:

1. A fuel element for use in a nuclear reactor, including in combination, a solid elongated generally cylindrical fuel body, a sealed elongated generally cylindrical metallic container enclosing said fuel body, said fuel body having an outer diameter sufficiently less than the inner diameter of said container so as to provide a thermal insulating gap therebetween throughout the operating range of temperatures of said fuel element, means disposed intermediate each end of said fuel body and the corresponding end of said metallic container for insulating the ends of said container, and spacer means disposed intermediate said container and the cylindrical surface of said fuel body to maintain said insulating gap between said fuel body and said container.

2. The combination of claim 1 wherein said insulating gap is filled with gas.

3. The combination of claim 2 wherein said gas is nitrogen.

4. The combination of claim 1 wherein said spacer means comprise a plurality of protuberances extending from said container and engaging said fuel body.

5. The combination of claim 4 wherein said protuberances each comprise a dimple formed in said container and extending interiorly thereof to engage said fuel body.

6. A fuel element for use in a pulsing nuclear reactor wherein water surrounds said fuel element for cooling the same, said fuel element including in combination, a solid elongated generally cylindrical fuel body, a generally cylindrical elongated metallic container enclosing said fuel body, means sealing each end of said container for preventing the entry of water therein, a pair of graphite cylinders, each disposed between a respective end of said fuel body and a corresponding sealed end of said container, said fuel body having an outer diameter sufficiently less than the inner diameter of said container that a substantial difference in said diameters is maintained throughout the operating range of temperatures of said fuel element, and spacer means disposed intermediate said container and said fuel body to maintain a thermal insulating gap between said fuel body and said container.

7. The combination of claim 6 wherein at least one of said graphite cylinders is spaced from the adjacent end of said container to permit axial expansion of said fuel body.

8. The combination of claim 6 wherein said spacer means comprise a plurality of dimples formed in said container and extending therefrom to engage said fuel body.

References Cited

UNITED STATES PATENTS

| | | | |
|---|---|---|---|
| 2,871,176 | 1/1959 | Draley et al. | 176—67 X |
| 2,990,359 | 6/1961 | Wyman | 176—81 |
| 3,125,493 | 3/1964 | D'Amore | 176—76 |
| 3,138,537 | 6/1964 | Bowden | 176—67 |
| 3,172,820 | 3/1965 | Lenngren et al. | 176—67 X |
| 3,243,352 | 3/1966 | Boudouresques | 176—79 |
| 3,255,090 | 6/1966 | Leirvik | 176—76 |

FOREIGN PATENTS

| | | |
|---|---|---|
| 798,282 | 7/1958 | Great Britain. |
| 835,132 | 5/1960 | Great Britain. |

CARL D. QUARFORTH, *Primary Examiner.*

BENJAMIN R. PADGETT, *Examiner.*

M. J. SCOLNICK, *Assistant Examiner.*